July 8, 1947.  J. W. DAWSON  2,423,438
ELECTRICAL FOLLOW UP MOTOR CONTROL SYSTEM
Filed Nov. 9, 1943  3 Sheets-Sheet 1

INVENTOR.
JOHN W. DAWSON,
BY Elmer J. Gorn
ATTY.

July 8, 1947.　　　　　J. W. DAWSON　　　　　2,423,438
ELECTRICAL FOLLOW UP MOTOR CONTROL SYSTEM
Filed Nov. 9, 1943　　　3 Sheets-Sheet 3

INVENTOR.
JOHN W. DAWSON,
BY Elmer J. Gorn
ATTY.

Patented July 8, 1947

2,423,438

UNITED STATES PATENT OFFICE 2,423,438

ELECTRICAL FOLLOW-UP MOTOR CONTROL SYSTEM

John W. Dawson, West Newton, Mass., assignor to Raytheon Manufacturing Company, Newton, Mass., a corporation of Delaware Application November 9, 1943, Serial No. 509,631

8 Claims. (Cl. 172—239)

1

This invention relates to a follow-up system in which a controlled element, such as a directional radiating antenna structure, is caused to follow the rotation of a remotely-located controlling member. In such devices a tendency exists for the controlled element to overshoot its final or zero position as determined by the controlling member, and thus subject the system to a hunting action which introduces inaccuracies and delays in the operation of such systems.

An object of this invention is to devise a simple apparatus for substantially eliminating such overshooting or hunting tendencies in systems of the foregoing type.

Another object is to devise a system in which any tendency for the controlled element to lag behind the controlling element to an excessive degree is substantially eliminated.

Another object is to devise anti-hunting systems of the foregoing type in which the dynamic response thereof is improved.

A still further object is to accomplish the foregoing by an electrical control system which is simple and reliable.

The foregoing and other objects of this invention will be best understood from the following description of an exemplification thereof, reference being had to the accompanying drawing, wherein.

Figure 1:
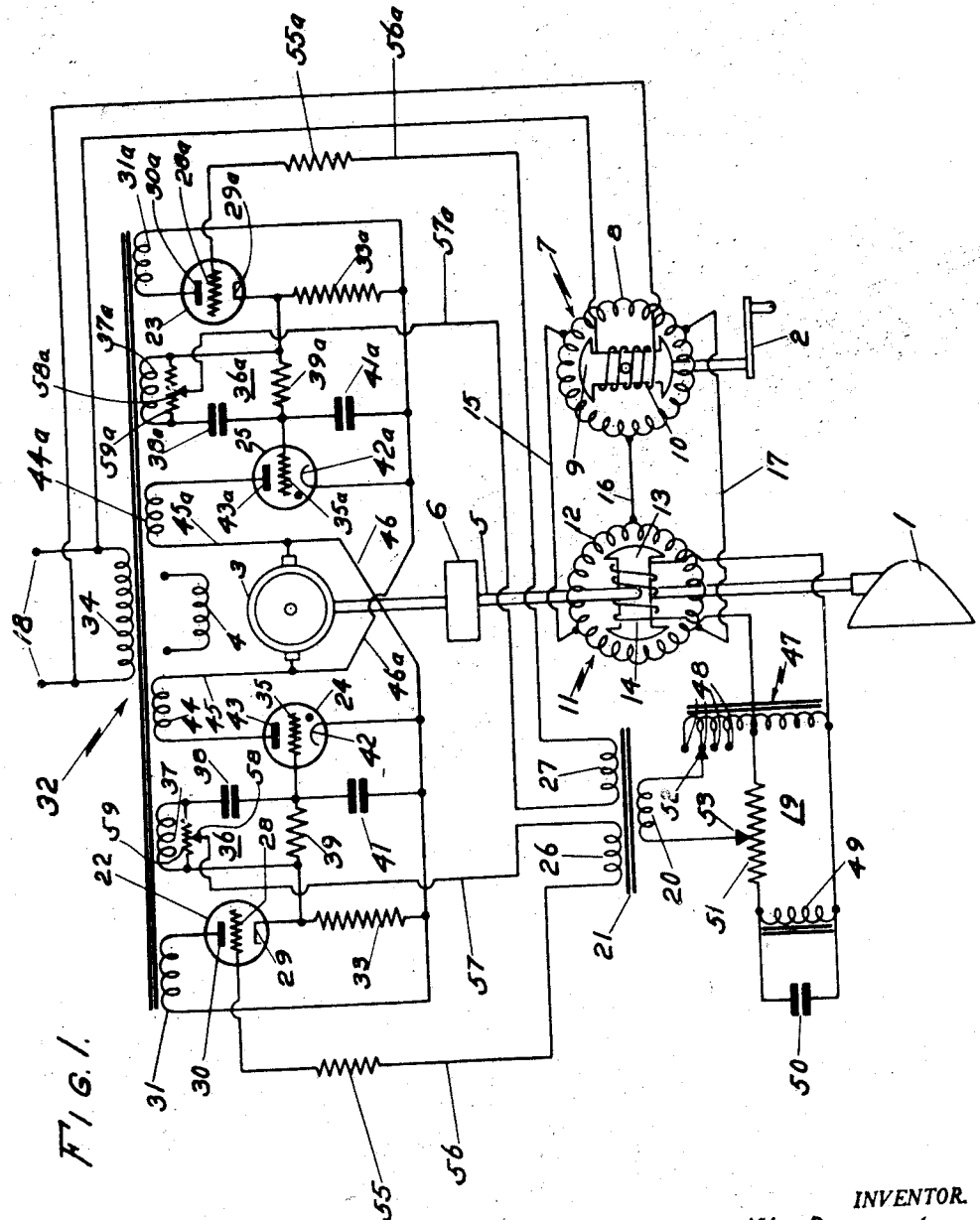
Fig. 1 is a schematic diagram of a system constructed in accordance with my invention.
Figure 2:
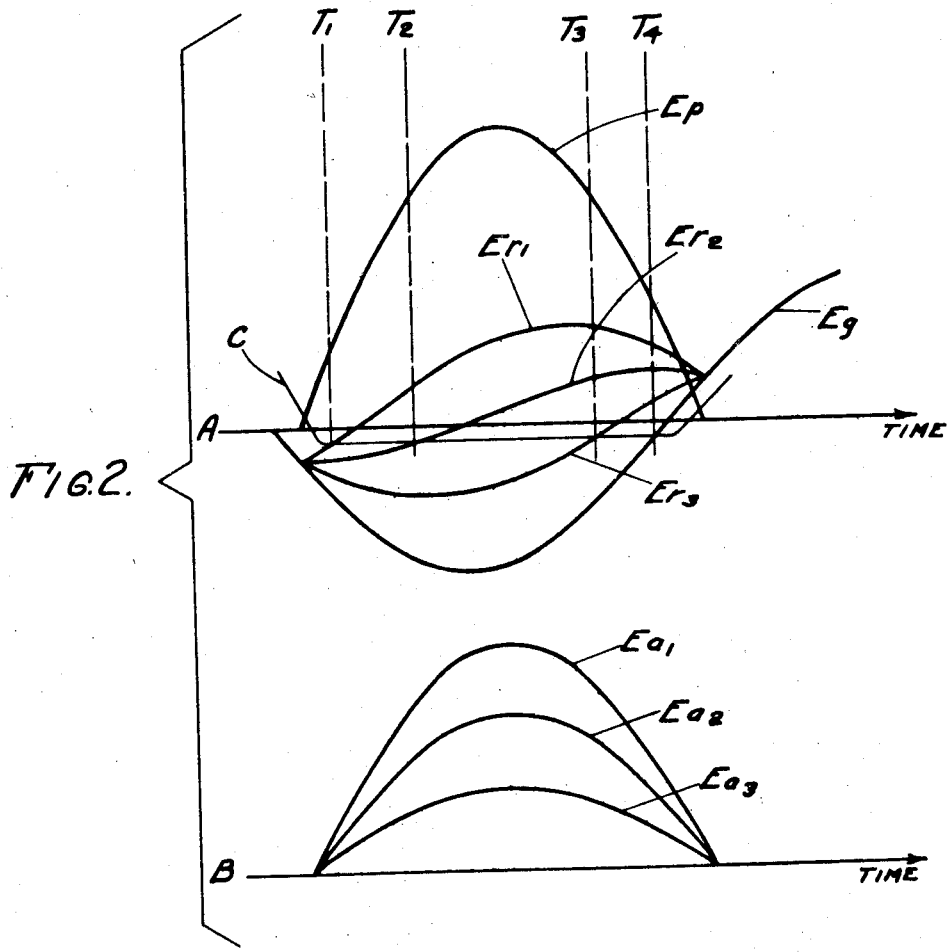
Fig. 2 is a set of curves illustrating certain details of operation of the system shown in Fig. 1.

In the system illustrated in Figs. 1 and 2, a controlled object 1, such as a directional radiating antenna system for radiating super-high frequency waves is to be controlled in its position by a remotely-located controlling member 2, such as a hand crank. Of course it is to be understood that this controlling member may take any other form which is well known in follow-up systems of this type. The controlled object 1 is driven to its desired position by means of a direct current commutator motor 3 having a field winding 4. The field winding is adapted to be supplied with magnetizing current from a suitable source of direct current, not shown, in order to energize the field of the motor. Motor 3 drives a drive shaft 5 preferably through a gear reduction drive 6. Controlled object 1 is mounted upon and moved by the drive shaft 5.

The motion of the controlling object 2 controls a synchro 7 consisting of a stator having a closed stator winding 8 and a movable armature 9 carrying a winding 10. Motion of the controlling

2 object 2 will rotate the armature 9 in a clockwise or counterclockwise direction depending upon the direction of motion of said controlling object. Associated with the synchro 7 is a similar synchro 11 consisting of a stator having a closed winding 12 and a rotatable armature 13 carrying a winding 14. The armature 13 is likewise mounted upon and driven by the drive shaft 5. Three equally spaced points on the stator winding 8 are connected by conductors 15, 16 and 17 to three similarly spaced points on the stator winding 12. The armature winding 10 is energized with alternating current from a pair of terminals 18 which may be energized from a standard 60-cycle, 115-volt source.

As is well known, the alternating current field of the armature 9 is reproduced in the space within the stator winding 12, and induces a voltage in the armature winding 14 unless the armature 13 is substantially at right angles to said field. Thus the voltage induced in the winding 14 is a measure of the deviation of the armature 13, and likewise of the controlled member 1 from the zero position which is the desired position of coincidence between controlling member 2 and controlled member 1.

The voltage generated in the armature winding 14 is conducted through an anti-hunt network 19, which will be described in detail below, to the primary winding 20 of an input transformer 21 which controls a servo amplifier. The servo amplifier comprises a pair of high vacuum triodes 22 and 23, which in turn control a pair of thyratrons 24 and 25. The thyratrons 24 and 25 control the magnitude and direction of the current supplied to the armature of motor 3, and thus control the magnitude and direction of the torque exerted by said motor.

The input transformer 21 is provided with a pair of secondary windings 26 and 27. The voltage of the secondary winding 26 is impressed between the control grid 28 of triode 22 and the cathode 29 of said triode. A grid resistor 55 is inserted in the lead 56 extending to the grid 28. The cathode lead 57 is connected to a tap 58 on a potentiometer 59 connected across a secondary winding 31 of a power supply transformer 32. In this way an adjustable alternating current bias is impressed on the grid 28 in addition to the voltage delivered by the secondary winding 26. The cathode 29 may be of the indirectly-heated thermionic type provided with a suitable filamentary heater, not shown. The triode 22 is likewise provided with an anode 30 which is connected through a secondary winding 31 of the power supply transformer 32, and a resistance 33 to the cathode 29 of triode 22. The power supply transformer 32 is provided with a primary winding 34 which is likewise energized from the power supply terminals 18. Thus during each half cycle, when the anode 30 is positive, a voltage pulse will be developed across the resistance 33 provided the grid 28 is positive with respect to the cathode 29, and the magnitude of said pulse will be dependent upon the magnitude of the voltage delivered to said grid 28 by the secondary winding 26. The phase of the A. C. bias at the tap 58 is in opposition to the phase of the voltage on the anode 30. Thus when the voltage delivered by the secondary winding 26 is in phase with the voltage on the anode 30, the A. C. bias will tend to flatten the voltage curve supplied to the grid 28. This accomplishes a beneficial result which will be pointed out below.

The voltage developed across the resistance 33 is used to control the voltage on the control grid 35 of the thyratron 24, and thus to control the time at which thyratron 24 fires. For this purpose the cathode 29 of triode 22 is connected through a network 36, which supplies a phase-shifted voltage, to the grid 35. Network 36 consists of the auxiliary secondary winding 37 on the transformer 32 with a condenser 38 and a resistance 39 connected in series across said secondary winding 37. The point between the resistance 39 and the condenser 38 is connected to the grid 35, while the other end of the resistance 39 is connected to the cathode 29. A condenser 41 preferably is connected between the grid 35 and the cathode 42 of the thyratron 24. The cathode 42 may be of the filamentary thermionic type. The thyratron 24 is also provided with an anode 43 which is connected through a secondary winding 44 on transformer 32, conductor 45, the armature of motor 3, and conductor 46, back to the cathode 42.

The same connections described above for tubes 22 and 24 are likewise provided for tubes 23 and 25, and thus in Fig. 1 where the connections and elements are identical, the same reference numbers, with the addition of the letter $a$, are applied thereto. It will be noted that the connections are so arranged that the current delivered by thyratron 24 flows through the armature of motor 3, from right to left, while the current delivered by thyratron 25 flows through the armature of motor 3, from left to right. Thus conduction through tube 24 will tend to cause rotation of motor 3 in one direction, and conduction through tube 25 will tend to cause rotation of motor 3 in the opposite direction.

The anti-hunt network 19 includes an auto-transformer 47, the output of armature 14 being connected across a portion of the windings thereof. The auto-transformer 47 is provided with a plurality of taps 48, so that a predetermined ratio between the input and the output voltages of said auto-transformer may be selected. Preferably across the same portion of the auto-transformer which is connected to the output of armature winding 14 is connected an inductance 49 in parallel with a condenser 50, said parallel circuit being connected in series with an impedance 51 which is preferably a resistance. The primary winding 20 is connected between a contact 52 on the selected tap 48 and a variable tap 53 on the resistance 51. The parallel circuit comprising the inductance 49 and the condenser 50 is tuned to the frequency of the voltage source at the terminals 18.

When the controlling member 2 is moved so as to produce an angular displacement of the armature 9, a voltage appears across the armature winding 14, as already described. This voltage will be either in phase or 180° out of phase with the line voltage at the input terminals 18, depending upon either the direction of rotation of the armature 9 or upon whether the armature 13 is leading or lagging the armature 9. This voltage, which is affected in magnitude by the anti-hunt circuit 19, as will be described below, is impressed on the grids 28 and 28a through the transformer 21. The anodes of tubes 22 and 24 are connected in opposite phase to that of the anodes of tubes 23 and 25, so that the anode voltages of the two pairs of tubes are 180° out of phase with each other. However, there are substantially no displacements introduced by the circuits themselves, so that said anode voltages likewise can be considered in phase and 180° out of phase with the line voltage at the terminals 18. The connections between the secondary windings 26 and 27 and the respective grids 28 and 28a are so arranged that the voltages on said grids 28 and 28a are in phase with each other. Thus when grid 28 is positive with respect to its cathode 29, the grid 28a will likewise be positive with respect to its cathode 29a.

The operation, particularly of the thyratrons 24 and 25, will be explained in connection with the curves as shown in Fig. 2. Along axis A are plotted the voltage conditions of one of the thyratrons, for example thyratron 25. The curve $Ep$ represents a positive half cycle of voltage as applied to the anode 43a. The curve C is the grid characteristic curve of tube 25, representing values of grid voltage above which tube 25 will start conducting current. The curve $Eg$ represents the voltage which the network 36a impresses on the grid 35a. It will be seen that the voltage $Eg$ is so delayed in phase with respect to the voltage $Ep$, that $Eg$ does not intersect C until at a time $T_4$, which is very late in the positive half cycle. With the voltage $Eg$ alone impressed upon the grid 35a, tube 25 will conduct substantially no current. We may now assume that the armature 9 is displaced in such a direction as to generate a voltage in the secondary windings 26 and 27, which is in phase with the line voltage, and we may likewise assume that the voltages on the anodes 30 and 43 are in phase with said line voltage. When the voltage on the anodes of tubes 23 and 25 become positive so as to tend to permit said tubes to conduct current, the voltage on grid 28a will be out of phase with the anode voltage so as to be negative with respect to the cathode 29a throughout the time that the anode 30a is positive. This prevents said tube 23 from conducting current, and thus no voltage will appear across the resistance 33a. Under these conditions the only voltage which is impressed upon the grid 35a is that of the network 36a, so that the tube 25 conducts substantially no current as described above in connection with Fig. 2.

As the anode 30 of tube 22 becomes positive, the grid 28 will have a positive voltage impressed upon it, which voltage will be governed in magnitude in the first instance by the magnitude of the voltage generated by the armature winding 14. The armature voltage is in turn proportional to the angular deviation between armatures 9 and 13. The anti-hunt circuit 19 may introduce an additional variation in the magnitude of the voltage impressed on the grid 28, as will be described more fully below. The positive voltage thus impressed on grid 28 causes a flow of current through the tube 22. This flow of current produces a voltage drop through resistance 33.

In Fig. 2, along axis B, are plotted a number of different magnitudes of voltage $Ea_1$, $Ea_2$, $Ea_3$, as developed across the resistance 33. The curves as plotted along axis A of course apply equally to tube 24. It will be seen that in the circuit of Fig. 1, the voltage developed across the resistance 33 is added vectorially to the voltage across the network 36. Along axis A the results of such vectorial additions between the voltage $Eg$ and the voltages $Ea_1$, $Ea_2$ and $Ea_3$ are plotted as $Er_1$, $Er_2$ and $Er_3$. It will be seen that as the magnitude of the voltage $Ea$ increases, the voltage $Er$ intersects the grid characteristics much earlier in the voltage cycle $Ep$, so that tube 24 will be ignited at the times $T_1$, $T_2$ and $T_3$, with the corresponding voltages $Ea_1$, $Ea_2$ and $Ea_3$. Thus an increase in the angular deviation between the armatures 9 and 13 will advance the firing time of the tube 24 and cause it to deliver an increased current flow to the armature of motor 3. This current flows through said armature from right to left, and produces energization of the motor and rotation of its armature. Thereupon the motor 3 tends to rotate in one direction to drive the armature 13 toward its zero position.

Upon reversal of the phase of the voltage at the input terminals 18, anodes 30 and 43 become negative, and the tubes 22 and 24 cease conducting current. At the same time the voltage on the anodes 30a and 43a becomes positive. However, the voltage across the secondary winding 27 has reversed, causing the grid 28a to become negative with respect to its cathode 29a. Thus the tube 23 and its controlled tube 25 do not conduct current during such reversed phase.

On the next reversal of the phase of the voltage, the anodes 30 and 43 of tubes 22 and 24 again become positive, and the action previously described is repeated, resulting in the supply through the armature of motor 3 of another pulse of direct current flowing from right to left through said armature. As long as the armature 13 has not been driven to its zero position by the motor, the above action is repeated each half cycle, and the armature of motor 3 continues to be supplied with rectified direct current flowing from right to left through said armature, said rectified current consisting of pulses of direct current supplied from the tube 24. When the armature 13 reaches its zero position, the voltage across the secondary winding 26 drops to zero, and the tube 22 together with its controlled tube 24 cease to deliver an appreciable amount of current, whereupon the armature of motor 3 is no longer supplied with sufficient current to produce rotation, and said motor stops.

If we assume now that the conditions of motion of the armature 9 are such as to generate a voltage in the armature winding 14 which is 180° out of phase with the line voltage, the controlling voltage appearing across the secondary winding 27, as impressed upon the grid 28a, will now be in phase with the voltage on the anode 30a, while the voltage impressed on the grid 28 will be out of phase with the voltage on its anode 30a. Under these conditions, tubes 23 and 25 will operate to supply pulses of direct current flowing through the armature of motor 3, from left to right, in a manner similar to that described above in connection with the operation of tubes 22 and 24. Under these conditions the armature of motor 3 will rotate in the opposite direction so as to drive the armature 13 to its zero position, in which the controlled member 1 moves to the position as determined by the setting or motion of the controlling member 2.

In practice the variation in the voltage of the grids 28 and 28a in phase with their respective anodes 30 and 30a tends to impart to the voltage developed across the resistances 33 and 33a a peaked third harmonic effect. The inclusion of the A. C. bias at the taps 58 and 58a tends to counteract this tendency by flattening out the grid voltage curve as described above. Under these conditions the sine wave curves of Fig. 2B are more closely approximated.

In absence of the anti-hunt circuit 19, the controlled member 1 under the foregoing system might tend to overshoot or hunt. This tendency, however, is substantially eliminated by the presence of this anti-hunt circuit. If an angular deviation is produced between the armatures 9 and 13, a voltage will be generated in the armature winding 14, as already described. If this angular deviation does not change, the amplitude of the voltage supplied by the armature winding 14 will likewise remain fixed. Since the parallel circuit consisting of the inductance 49 and condenser 50 is tuned to the frequency of this voltage, it will act as a substantially infinite impedance to said voltage which is impressed upon it. In an actual embodiment, of course, the impedance is not infinite. However, the higher the Q of circuit 49, 50 is made, the more nearly will said circuit act as an infinite impedance. As is well known, $$Q = \frac{\omega L}{R}$$

where $\omega = 2\pi f$, and L is the inductance of element 49, R is the resistance of the parallel circuit 49, 50, and $f$ is the frequency of the voltage supplied thereto. Values of Q of at least 30 are readily obtainable in a practical system. With such values for Q, the parallel circuit 49, 50 will present a sufficiently high impedance to a constant amplitude of voltage impressed thereon so as to limit the flow of current through the resistance 51 to a substantially negligible value. Under the above conditions of a fixed angular deviation between the armatures 9 and 13, the magnitude of the control voltages supplied to the grids 28 and 28a will be governed solely by said angular deviation. If, however, said angular deviation decreases at a given rate, the voltage across the parallel circuit 49, 50 will likewise decrease at said given rate. Under these conditions the circuit 49, 50 tends to operate as an oscillator, and attempts to maintain the voltage across the inductance 49 at the previously established level. Therefore, an unbalance between the voltage which appears across the lower portion of the auto-transformer 41, and the voltage which appears across the inductance 49 will be created, resulting in a flow of current through the resistance 51. This voltage will be subtracted from the voltage across the upper portion of the auto-transformer 41 which is impressed on the winding 20. The net effect, therefore, of such a rate of decrease of the angular deviation between the armatures 9 and 13 will be a reduction in the magnitude of the voltage supplied to the primary winding 20. This in turn will produce a decrease in the amount of current as supplied to the armature of motor 3 in accordance with the description as given above. As the rate of decrease of the angular deviation between the armatures 9 and 13 increases, the voltage appearing across the resistance 51 will increase, resulting in a greater reduction in the magnitude of the control voltages as applied to the grids 28 and 28a.

It will be recognized that if the armature 9 is rotated at a high angular speed and the armature 13 rotates at a correspondingly high angular speed, no anti-hunt influence is required. It is only when the angular deviation between the armatures 9 and 13 starts to decrease at a substantial rate that some anti-hunt influence should be exerted upon the system. From the above description it will be seen that the anti-hunt operation of the circuit 19 follows the above desired relationship.

As the angular deviation between the armatures 9 and 13 decreases, the voltage across the upper portion of auto-transformer 47 supplied to the winding 20 will decrease. Therefore, if said angular deviation decreases at a sufficiently rapid rate, it is possible for the voltage developed across the resistance 51 at the tap 53 to exceed the voltage across the upper portion of the auto-transformer 47, and thus reverse the phase of the control voltage as applied to the primary winding 20. This will not only decrease the magnitude of the current as supplied to the armature of motor 3, but will actually extinguish the previously conducting thyratron and cause the previously non-conducting thyratron to conduct current. This will produce a reversal in the voltage applied to the armature of motor 3, and exert a dynamic braking action on said armature and thus on the motion of the controlled object 1. Thus it will be seen that such a dynamic braking action will be exerted in cases where otherwise an overshooting of the final position of the controlled object 1 might occur.

The network 19 not only operates so as to overcome tendencies for the system to hunt, but also acts to speed up the operation of the system where the controlled object 1 tends to move toward the final predetermined position too slowly. If the angular deviation between the armatures 9 and 13 starts to increase at a given rate, it will be seen that the voltage across the lower portion of the auto-transformer 47 will exceed the voltage established across the inductance 49, and thus produce a flow of current through the resistance 51, which is in the opposite vectorial direction to that which occurs when a decrease in the angular deviation takes place. Under conditions of an increasing angular deviation, the voltage across the resistance 51 delivered to the tap 53 will be added to the voltage supplied from the upper portion of the auto-transformer 47, and thus increase the current flow as delivered by the conducting thyratron. This will impart an added accelerating force to the armature 3 so as to tend to decrease the angular deviation between the armatures 9 and 13.

The degree to which the parallel circuit 49, 50 imparts the foregoing anti-hunt and accelerating influences can be adjusted by adjusting the positions of the taps 52 and 53.

The system described can be analyzed on a basis of the vectorial factors of the system in terms of its hunting frequency. In any follow-up system, the system as a whole, when possessing hunting tendencies, is closely analogous to an oscillating electrical system. The inertia of such a system can be represented as an inductance L, the friction or damping of the system can be represented as a resistance R, and the motor together with its restoring force tending to restore the mass of the system to a given position can be represented as a condenser C and an alternating voltage E. Such a system will have a natural hunting frequency of $$f = \frac{1}{2\pi\sqrt{LC}}$$

If the frequency of E is also equal to $f$, then the system will oscillate with the mass swinging back and forth past the given position without ever stopping at such position as desired. The reason why such a system oscillates is that E is usually delayed in phase with respect to the oscillation of the mass so that as said mass swings through the desired or zero position, the voltage E still tends to drive the motor in the same direction past said zero position, thus feeding energy into the system in such a direction as to sustain or even increase the oscillations. E can be considered as the signal voltage varying in magnitude at the hunting frequency (not the 60-cycle control frequency). Normally any such system introduces lags in the signal voltage as expressed in terms of E, and thus any such system tends to have a permanent hunting characteristic. If, however, E were to be advanced in phase so as to be in phase or leading with respect to the swinging of the mass through its zero position, then the oscillations would be damped quickly. By proper selection of the system constants, the system will be in a non-oscillatory condition in which there is no tendency for the mass to swing beyond its zero position. In the system as described in Figs. 1 and 2, it will be noted that the anti-hunt circuit 19 produces a phase shift in E which advances E with respect to the oscillations of the mass of the motor 3 and its associated load to such an extent as to substantially eliminate hunting tendencies.

Figure 3:
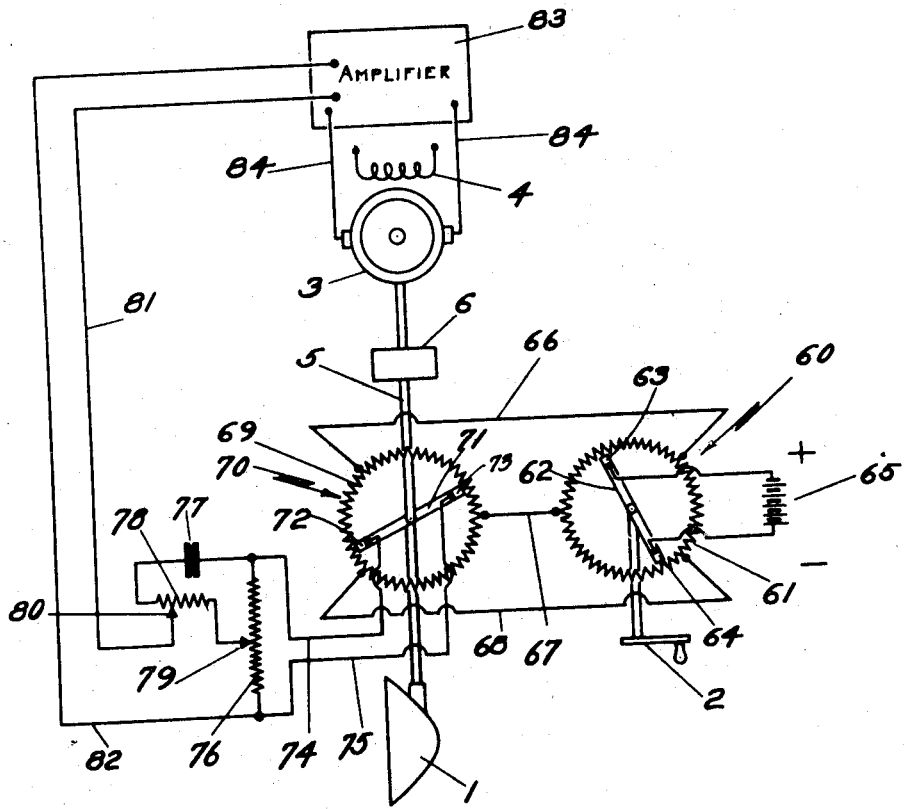
Fig. 3 is a schematic diagram of another embodiment of my invention.

Since, as pointed out above, the hunting variations of a follow-up system occur in alternating form at a hunting frequency, the foregoing analysis can be applied to anti-hunt systems in which a D. C. control voltage is utilized instead of the 60-cycle A. C. control voltage as described in connection with Fig. 1. Such an alternative arrangement is shown in Fig. 3, in which the same reference numerals are applied where the elements are identical with those of Fig. 1. In Fig. 3, however, the controlling object 2 regulates a bridge potentiometer 60 consisting of a resistance 61 connected in a closed loop and a movable arm 62 carrying brushes 63 and 64, which contact the resistance 61 at diametrically opposite points. Motion of the controlling object 2 will rotate the arm 62. A suitable source of direct current 65 is connected to the brushes 63 and 64. Three equally-spaced points on the resistance 61 are connected by conductors 66, 67 and 68 to three similarly spaced points on the closed resistor 69 of a similar bridge potentiometer 70. The bridge potentiometer 70 likewise has a rotatable arm 71 carrying brushes 72 and 73 contacting the resistance 69 at diametrically opposite points. The arm 71 is mounted upon and driven by the shaft 5. The brushes 72 and 73 are connected by conductors 74 and 75 to the opposite ends of a potentiometer 76. A condenser 77 is connected from one end of the potentiometer 76 through a resistance 78 to an intermediate tap 79 on said potentiometer 76. A tap 80 on the resistance 78 is connected to a conductor 81, while the lower end of the potentiometer 76 is connected to a conductor 82. The conductors 81 and 82 extend to an amplifier 83, the output of which is supplied by means of conductors 84 to the armature of motor 3.

As the controlling object 2 is moved, a D. C. signal voltage will be produced at the brushes 72 and 73, which will produce an operation of the amplifier 83 to operate the motor so as to drive the controlled object 1 toward a position of agreement with the controlling object 2 in a manner similar to that described above in connection with Fig. 1.

Figure 4:
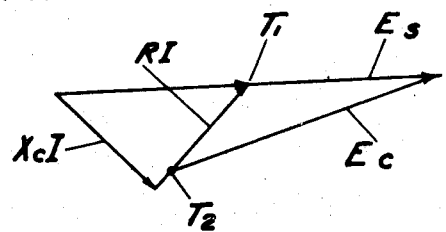
Fig. 4 is a vector diagram illustrating certain principles of operation of the system shown in Fig. 3.

In Fig. 3 the control voltage instead of being a 60-cycle alternating voltage is a substantially unidirectional voltage. As pointed out above, such a system may possess hunting tendencies which can be expressed in terms of alternating values at the natural hunting frequencies of the system. In Fig. 4 the vector relationships of the system shown in Fig. 3 are illustrated, said vectors being in terms of the natural hunting frequency of the system. The signal voltage delivered by the conductors 74 and 75 is represented as $E_s$. The condenser 77 would tend to have a voltage developed across it, which in terms of the hunting frequency of the system lags the voltage $E_s$. This lagging voltage is represented in Fig. 4 as $X_cI$. The voltage developed across the resistance 78 will, of course, be at right angles to the voltage $X_cI$, and is represented as $RI$. The vector sum of $X_cI$ and $RI$ is that portion of the voltage $E_s$ which occurs at $T_1$ corresponding to the position of the tap 79. The point $T_2$ and $R_1$ corresponds to the position of the tap 80 on resistance 78. The control voltage which occurs across the conductors 81 and 82 will thus be the voltage $E_c$ extending from $T_2$ to the end of $E_s$. It will be noted that the voltage $E_c$ leads the voltage $E_s$ by a substantial amount. The angle of lead can be so selected as to overcome the angular delay introduced into the system, and thus substantially eliminate hunting tendencies.

Of course, it is to be understood that this invention is not limited to the particular details as described above, as many equivalents will suggest themselves to those skilled in the art. For example, widely differing types of amplifying systems could be devised to supply current to the motor, provided such amplifying systems would respond to the magnitude of the control voltage as delivered by the armature winding 14 and the associated anti-hunt circuit 19. Thus, for example, instead of the triodes 22 and 23, pentodes with suitable biases on the grids might be utilized.

What is claimed is:

1. In a follow-up system, a controlling member adapted to be moved from one position to another, a controlled member adapted to be moved correspondingly, means for generating a voltage of a predetermined frequency in response to a deviation between the positions of said controlled and controlling members, means for connecting said voltage in series with an impedance means across a circuit consisting of an inductor and a capacitor connected in parallel and tuned to said predetermined frequency, means for deriving a control voltage equal to the difference between a voltage proportional to said first-named voltage and the voltage across said impedance means, driving means for driving said controlled member toward a position of agreement with said controlling member, and means for controlling said driving means in accordance with the magnitude of said control voltage.

2. In a follow-up system, a controlling member adapted to be moved from one position to another, a controlled member adapted to be moved correspondingly, means for generating a voltage of a predetermined frequency in response to a deviation between the positions of said controlled and controlling members, means for connecting said voltage in series with a resistor across a circuit consisting of an inductor and a capacitor connected in parallel and tuned to said predetermined frequency, means for deriving a control voltage equal to the difference between a voltage proportional to said first-named voltage and the voltage across said resistor, driving means for driving said controlled member toward a position of agreement with said controlling member, and means for controlling said driving means in accordance with the magnitude of said control voltage.

3. In a follow-up system, a controlling member adapted to be moved from one position to another, a controlled member adapted to be moved correspondingly, means for generating a voltage of a predetermined frequency in response to a deviation between the positions of said controlled and controlling members, said voltage being reversible in phase depending upon the direction of rotation of said controlling member and upon whether said controlled member is leading or lagging said controlling member, means for connecting said voltage in series with an impedance means across a circuit consisting of an inductor and a capacitor connected in parallel and tuned to said predetermined frequency, means for deriving a control voltage equal to the difference between a voltage proportional to said first-named voltage and the voltage across said impedance means, reversible driving means for driving said controlled member toward a position of agreement with said controlling member, and means for controlling the force of said driving means in accordance with the magnitude of said control voltage and for controlling the direction of the application of the force of said driving means in accordance with the phase of said control voltage.

4. In a follow-up system, a controlling member adapted to be moved from one position to another, a controlled member adapted to be moved correspondingly, means for generating a voltage of a predetermined frequency in response to a deviation between the positions of said controlled and controlling members, said voltage being reversible in phase depending upon the direction of rotation of said controlling member and upon whether said controlled member is leading or lagging said controlling member, means for connecting said voltage in series with a resistor across a circuit consisting of an inductor and a capacitor connected in parallel and tuned to said predetermined frequency, means for deriving a control voltage equal to the difference between a voltage proportional to said first-named voltage and the voltage across said resistor, reversible driving means for driving said controlled member toward a position of agreement with said controlling member, and means for controlling the force of said driving means in accordance with the magnitude of said control voltage and for controlling the direction of the application of the force of said driving means in accordance with the phase of said control voltage.

5. In a follow-up system, a controlling member adapted to be moved from one position to another, a controlled member adapted to be moved correspondingly, means for generating a voltage of a predetermined frequency in response to a deviation between the positions of said controlled and controlling members, means for connecting said voltage in series with an impedance means across a circuit consisting of an inductor and a capacitor connected in parallel and tuned to said predetermined frequency, means for deriving a control voltage equal to the difference between a voltage proportional to said first-named voltage and the voltage across said impedance means, driving means for driving said controlled member toward a position of agreement with said controlling member, a controlled ignition type tube for delivering energizing current to said driving means, said tube normally having such a delayed firing angle as to deliver substantially no current to said driving means, and means for advancing the firing angle of said tube in accordance with the magnitude of said control voltage.

6. In a follow-up system, a controlling member adapted to be moved from one position to another, a controlled member adapted to be moved from one position to another, means for generating a voltage of a predetermined frequency in response to a deviation between the positions of said controlled and controlling members, means for connecting said voltage in series with an impedance means across a circuit consisting of an inductor and a capacitor connected in parallel and tuned to said predetermined frequency, means for deriving a control voltage equal to the difference between a voltage proportional to said first-named voltage and the voltage across said impedance means, reversible driving means for driving said controlled member toward a position of agreement with said controlling member, said driving means comprising a direct current motor whose driving force reverses with a reversal of the current supplied thereto, a pair of controlled ignition type rectifying tubes for delivering energizing current to said driving means, said tubes operating to deliver current to said driving means in opposite directions, each of said tubes normally having such a delayed firing angle as to deliver substantially no current to said driving means, and means for causing one of said tubes to conduct when said control voltage has a predetermined phase and for causing the other of said tubes to conduct when said control voltage has the opposite phase and for advancing the firing angle of the conducting tube in accordance with the magnitude of said control voltage.

7. In a follow-up system, a controlling member adapted to be moved from one position to another, a controlled member adapted to be moved correspondingly, means for generating an alternating control voltage of a predetermined frequency in response to a deviation between the positions of said controlled and controlling members, driving means for driving said controlled member toward a position of agreement with said controlling member, means for controlling said driving means in accordance with the magnitude of said control voltage, and anti-hunt means comprising an inductor and a capacitor in parallel tuned to said predetermined frequency and connected to said control voltage, and means responsive to the response of said parallel inductor and capacitor circuit for changing the response of said driving means to said control voltage.

8. In an electrical control system, means for producing an alternating control voltage of a predetermined frequency, controlled means responsive to said control voltage to produce an electrical output in accordance with said control voltage, said system having a substantial inertia tending to produce hunting, and anti-hunt means comprising an inductor and a capacitor in parallel tuned to said predetermined frequency and connected to said control voltage, and means responsive to the response of said parallel inductor and capacior circuit for changing the response of said controlled means to said control voltage.

JOHN W. DAWSON.

REFERENCES CITED

The following references are of record in the file of this patent:

UNITED STATES PATENTS

| Number | Name | Date |
|---|---|---|
| 1,684,137 | Mittag | Sept. 11, 1928 |
| 2,088,654 | Hull | Aug. 3, 1937 |
| 2,233,415 | Hull | Mar. 4, 1941 |
| 1,998,938 | Mittag | Apr. 23, 1935 |
| 1,554,698 | Alexanderson | Sept. 22, 1925 |